No. 646,433. Patented Apr. 3, 1900.
F. P. JONES.
POTATO DIGGER AND HARVESTER.
(Application filed Nov. 6, 1899.)
(No Model.) 2 Sheets—Sheet 1.
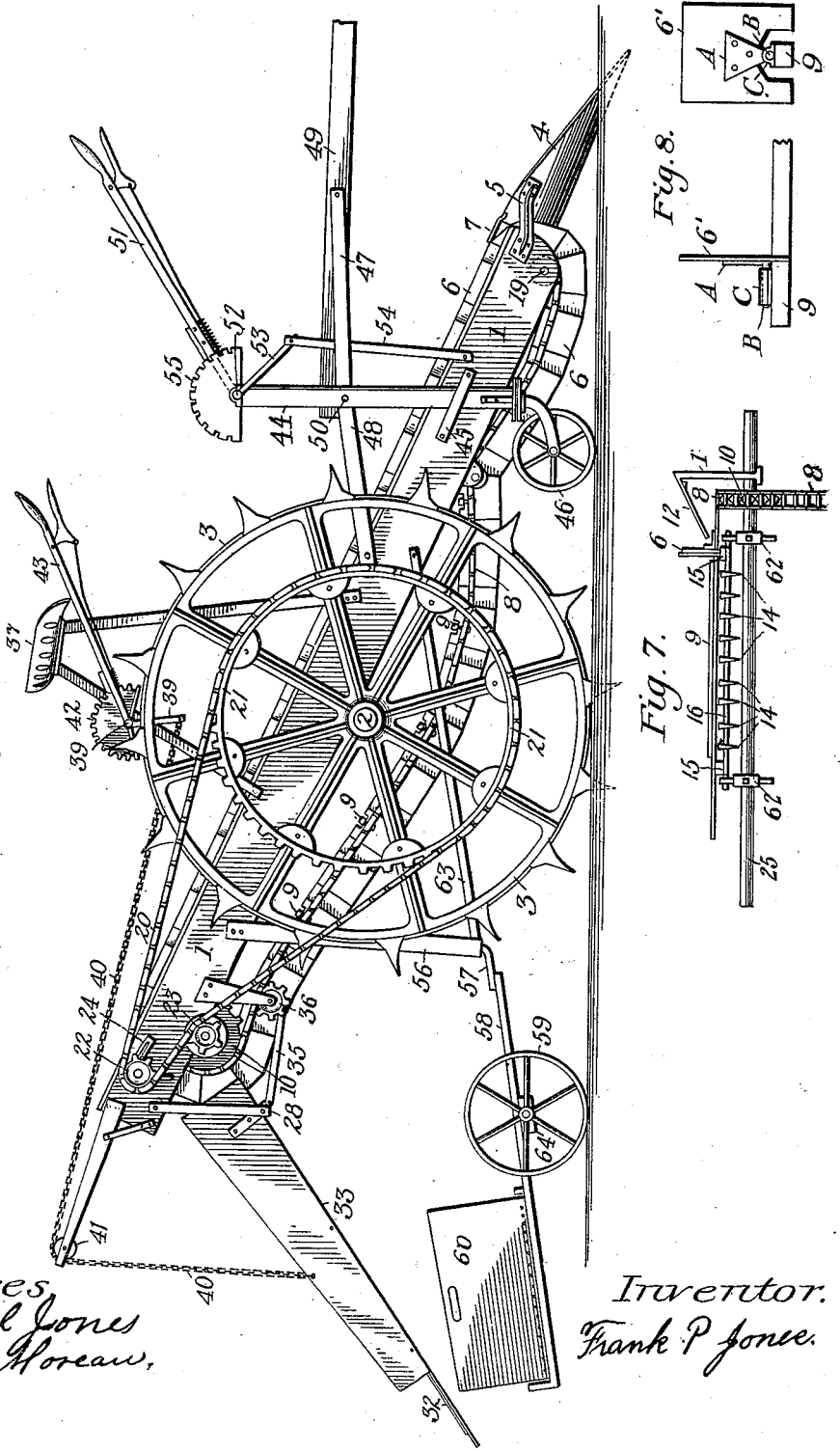
Witnesses
Daniel Jones
Wm M Moreau,
Inventor.
Frank P Jones.

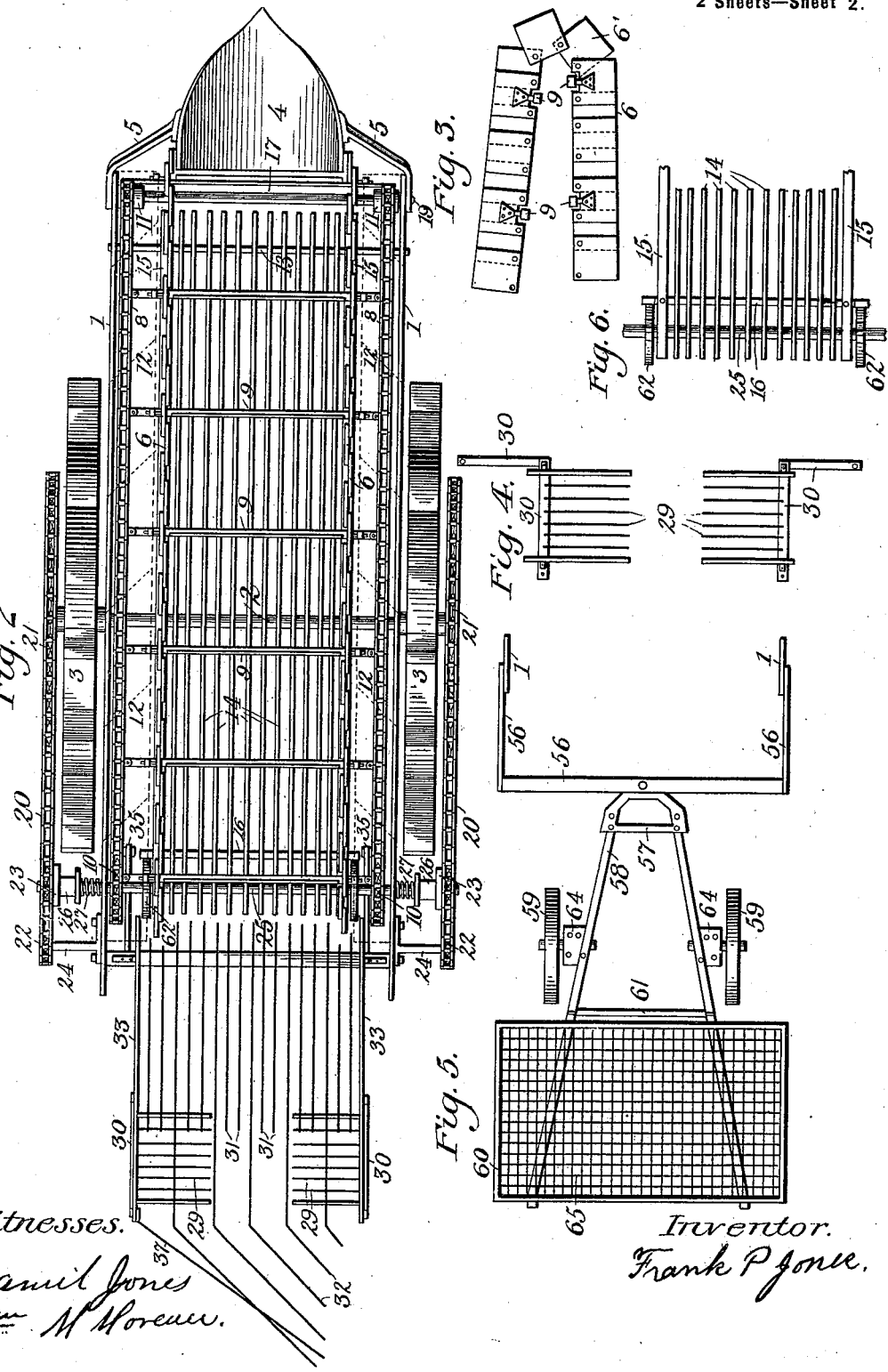

UNITED STATES PATENT OFFICE.

FRANK P. JONES, OF FREEHOLD, NEW JERSEY.

POTATO DIGGER AND HARVESTER.

SPECIFICATION forming part of Letters Patent No. 646,433, dated April 3, 1900.

Application filed November 6, 1899. Serial No. 735,966. (No model.)

*To all whom it may concern:*

Be it known that I, FRANK P. JONES, a citizen of the United States, residing at Freehold, in the county of Monmouth and State of New Jersey, have invented certain new and useful Improvements in Potato Diggers and Harvesters, of which the following is a specification.

The objects of my invention are, first, anticlog, obtained by revolving sides in connection with elevator; second, easy draft, obtained by first being anticlog; second, by elevator-chains being covered and kept clean and oiled; third, by arrangement of truck to have team close to machine, and, fourth, by simplicity of construction and operation of sifter, the third object being durability, obtained by reasons above stated, and the fourth to elevate high enough to sift and catch. I attain these objects by the mechanism illustrated in the accompanying drawings, in which—

Figure 1 is a side view of machine; Fig. 2, a plan view minus trucks. Figs. 3, 4, and 6 illustrate parts of said machine to which reference will be made; Fig. 5, a plan view of truck and receptacle to carry and catch potatoes from sifter, Fig. 7 showing cross-section of rods 14 and 15 and cross-section of cover 12; Fig. 8, enlarged parts, showing pivotal connection of plates 6' (of upright chains 6) with cross-bars 9.

Similar numbers refer to similar parts in all figures. New parts will be set forth in claims.

The machine consists of two frames 1, pivoted on axle 2 of drive-wheels 3; scoop 4, attached to frames 1 by brace-irons 5, arranged to deposit dirt, vines, and potatoes between upright chains 6; two short rods 7, extending from upper sides of scoop to carry vines over turn of upright chains 6. (Seen in Fig. 1.)

Upright endless chains 6, formed by plates 6', Fig. 3, riveted together, and corresponding plates secured upright and pivoted to cross-bars 9 and acting in connection with cross-bars 9 and elevator-chains 8 as revolving sides. In Fig. 8 plates A are shown secured to plates 6', having arms B turning in boxes C, said boxes secured to cross-bars 9. Objects being, first, to aid in elevating instead of resisting as stationary sides; second, to hold dirt from elevator-chains 8, sprocket-wheels 10, and rollers 11, all of which are covered by covers 12, (indicated by dotted lines, Fig. 2,) hinged at tops of frames 1, hanging over said parts to keep clean. Shaft 19, journaled in frames 1, provided with rollers 11 for elevator-chains 8, and roller 17 for upright chains 6 to pass around. (Shown in Fig. 2.)

Elevator-screen rods 14, wider on top edge than under edge (sides converging to a point at under edge) to prevent clogging; rods 15 wider than 14 and held directly under upright chains 6 to help support rods 14 and 15, curved over drive-shaft 25 to points not interfering with turn of cross-bars 9 to insure deposit from elevator to sifter; bar 16, arranged to hold rods 14 and 15 in place and provided with rollers on ends to catch and let go spokes of tappet-wheels 62 to agitate screen; tappet-wheels 62, secured to drive-shaft 25, provided with spokes to raise and let go hold-iron 16, connected with screen-rods, Figs. 2 and 6.

Gear connected from outside of drive-wheels 3, object being to have frames 1 close to drive-wheels and more space between said frames without widening drive-wheels. Gear attained by drive-chains 20 passing around sprocket-wheels 21, (said wheels secured to outside of drive-wheels,) around guide-wheel 22, over gear-wheel 23. (Shown in Fig. 1.) Guide-wheels held in place by standards 24, secured to frames 1 and arranged to vary distance between guide-wheels and drive-wheels.

Gear-wheels 23, having ends of drive-shaft 25 for axles and connected with drive-shaft by collars 26, notched at outer ends, fitting in corresponding grooves in gear-wheels 23, collars held in gear-wheels by spiral springs 27 between frames 1 and collars, collars slipped on and fastened to turn with drive-shaft by notches on inside of collars fitting in grooves in drive-shaft, collars held to frames 1, breaking connection with gear-wheels when out of gear by a device not shown. The object of collars, gear-wheels, and springs so arranged, in connection with drive-shaft, is in turning machine while in gear when one drive-wheel is turning drive-shaft by corresponding gear-wheel and collar the opposite collar (being so arranged) can turn with drive-shaft and slip in and out of gear-wheel till corresponding gear-wheel starts.

Sifter constructed by iron bar 28, holding-rods 31 and 32, (see Fig. 2,) forming bottom, and holding-plates 33, forming sides, under edges of plates 33 and rods 31 and 32 extending on a plane from bar 28, rods 31 shorter than plates 33 to allow potatoes to drop through in receptacle or on rods 29 and ground, rods 32 longer than plates 33 to carry vines over receptacle, Fig. 1, rods 32 bent at given angles beyond ends of plates 33 and receptacle to direct vines to one side, rod 37, secured to plate 33, extending over rods 32 to insure deposit of vines to one side. Rods 29, Figs. 2 and 4, secured to plates 33 by bar 30, said rods extending across under ends of rods 31, free ends being nearest to ground to direct potatoes from rods 31 to a narrow row on ground, rods 29 removed when potatoes are to be caught in receptacle, as in Fig. 1.

Sifter supported by hangers 34 pivotally connecting ends of bar 28 with frames 1 and chains 40 pivotally connecting outer ends of plates 33 with pulleys 41, parts so arranged to permit vibratory motion of sifter. Sifter vibrated by shaker-rods 35, pivoted to sifter at under side of bar 28 and on axles secured to sprocket-wheels 36 a distance from center, said wheels turned by elevator-chains 8 after passing around sprocket-wheels 10, wheels 36 held in place connected with sprocket-chains 8 by standards secured to frames 1.

Sifter adjusted by lever 43 thus: Outer ends of plates 33 connected with arms 38 of lever-shaft 39 and lever 43 by chains 40, passing through pulleys at 41, lever-shaft 39, having its bearings on and catch-iron 42, secured to supports for seat 37, lever 43 alongside of seat, seat for operator placed over axle 2, Fig. 1.

Truck for carrying front of machine and adjusting scoop 4 arranged thus, (shown in Fig. 1:) Truck-frame 44 extending over frames 1 and connected to tongue 49 by rods 47 and to frames 1 by rods 48, object being to have team close to machine, frames 44 extending alongside of and secured loosely to frames 1 by clamps 45, allowing frames 1 to be raised and lowered, ends of frame 44 bent at right angles and extending away from frames 1 a given distance, to which wheels 46 are attached as casters for truck, object being to permit short turning of machine.

Truck held upright and draft-connected by rods 47 pivotally connecting tongue 49 and frame 44 and rods 48 pivotally connecting frame 44 with frames 1, rod 50 supporting end of tongue 49 and bracing frame 44. Front of machine raised and scoop 4 adjusted by lever 51, lever-connected with shaft 52, shaft 52 bearing on frame 44 and having arms 53 pivotally connected with frames 1 by rods 54, lever held by catch-iron 55, secured to frame 44.

The objects of truck in connection with and at rear of machine are, first, to carry receptacle to catch potatoes from sifter as close to ground as possible when scoop 4 is in ground and machine is in operation; second, to raise said receptacle in connection with and at same time of raising scoop 4 from ground for turning machine.

Objects attained by (see Fig. 1) iron bar 56 extending across under machine and bent at right angles directly under and at a given distance from frames 1, so as not to interfere with returning elevator-chains, ends bolted to frames 1 a given distance from axles 2, and bar 56, braced by rods 63, connecting it with frames 1 ahead of axle 2.

Brace 57 pivotally connecting truck or rods 58 with the center of bar 56, rods 58 extending back over axles of wheels 59, away from each other, (see Fig. 5,) to points near the ground, where ends are turned up to hold receptacle 60, rods 58 braced by rod 61. Axles of wheels 59 secured to wheels and turning in boxes 65, attached under rods 58, object being to have truck turn easily. Receptacle 60 being oblong box with holes in ends for handles, crossed rods 65 forming sieve-bottom, Fig. 5, receptacle resting on ends of rods 58 under ends of rods 31 of sifter. (See Fig. 1.)

The objects of bar 56 and brace 57, arranged as shown, are, first, to guide and connect truck without interfering with elevator-chains; second, to connect front ends of rods 58 or front of truck with purchasing power of lever 51, working, in combination with frames 1, as levers over axle 2. Thus, lever 51 bearing on truck 44, lifting scoop 4 from ground and frames 1 ahead of axle 2, lowers frames back of axle 2, which by connection of frames 1 with rods 58 lowers said rods, which in turn, acting as levers over axle of wheels 59, raise receptacle 60 at same time of raising scoop.

Having thus described my invention, what I claim, and desire to secure by Letters Patent, is—

1. In a potato-digger, the combination of cross-bars 9 secured to and carried by elevator-chains 8, and corresponding plates 6' of upright endless chains 6 secured upright and pivoted on cross-bars 9 as and for the purpose above specified.

2. In a potato-digger, an elevator-screen having rods 14 wider on top edge than under edge, sides converging to a point at under edge, and having bar 16 holding screen-rods provided with a roller on each end, to catch on and let go of spokes of tappet-wheels 62, said wheels secured to drive-shaft 25, and provided with spokes to engage with, bar 16 holding screen-rods, as specified and set forth.

3. In a potato-digger, the combination of frames 1 supporting elevator, and covers 12 hinged on upper edges of frames 1, with and hanging over and covering, elevator-chains 8, sprocket-wheels 10 and rollers 11, as and for the purpose specified above.

In testimony whereof I affix my signature in the presence of two witnesses.

FRANK P. JONES.

Witnesses:
WILLIAM M. MOREAU.
DANIEL JONES.